United States Patent
Zhao et al.

(10) Patent No.: US 10,480,867 B2
(45) Date of Patent: Nov. 19, 2019

(54) COMBINED HEATING POWER AND COOLING APPARATUS WITH ENERGY STORAGE TYPE ADAPTED TO AN ACTIVE DISTRIBUTION NETWORK AND ITS METHOD

(71) Applicant: TSINGHUA UNIVERSITY, Beijing (CN)

(72) Inventors: Xiling Zhao, Beijing (CN); Lin Fu, Beijing (CN); Shigang Zhang, Beijing (CN); Xingmei Zhang, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 73 days.

(21) Appl. No.: 15/319,356

(22) PCT Filed: Dec. 10, 2015

(86) PCT No.: PCT/CN2015/096997
§ 371 (c)(1),
(2) Date: Dec. 15, 2016

(87) PCT Pub. No.: WO2016/127698
PCT Pub. Date: Aug. 18, 2016

(65) Prior Publication Data
US 2017/0131037 A1 May 11, 2017

(30) Foreign Application Priority Data
Feb. 12, 2015 (CN) .......................... 2015 1 0076196

(51) Int. Cl.
*F28D 21/00* (2006.01)
*F01K 17/00* (2006.01)
(Continued)

(52) U.S. Cl.
CPC ........ *F28D 21/0003* (2013.01); *F01K 17/005* (2013.01); *F01K 17/025* (2013.01);
(Continued)

(58) Field of Classification Search
CPC ...... F28D 17/00; F28D 17/04; F28D 20/0034; F28D 2020/0082; F28D 21/0003;
(Continued)

(56) References Cited

U.S. PATENT DOCUMENTS 4,660,375 A * 4/1987 Hyde .................... F01K 23/062
60/39.181
7,448,217 B2 * 11/2008 Savic .................... F01K 21/047
60/39.182
(Continued)

FOREIGN PATENT DOCUMENTS

CN 101498524 A 8/2009
CN 101799226 A 8/2010
(Continued)

OTHER PUBLICATIONS

ISA State Intellectual Property Office of the People's Republic of China, International Search Report Issued in Application No. PCT/CN2015/096997, dated Mar. 23, 2016, WIPO, 4 pages.

*Primary Examiner* — Keith M Raymond
*Assistant Examiner* — Gustavo A Hincapie Serna
(74) *Attorney, Agent, or Firm* — McCoy Russell LLP

(57) ABSTRACT

The Application relates to a combined heating power and cooling apparatus with energy storage for an active distribution network and its operating method. The apparatus is comprised of a generation apparatus, a generator, a waste heat recovering and absorbing heat pump, a high temperature flue gas-water heat exchanger, a medium temperature flue gas-water heat exchanger, a low temperature flue gas-water heat exchanger, an energy storing electric heat pump, a high temperature energy storing canister, a low temperature energy storing canister, a cooling tower, a number of circulating water pumps and a number of valves. The operating method changes the traditional operation modes of the system "determining electricity based on heat" and "determining electricity based on cooling", causes the system to regulate power of the generated electricity on grid, participate in the regulation of grid load, solve the problem of a limited ability of generation peak regulation due to the inter-coupling of power generation, heat supply and cooling supply.

4 Claims, 1 Drawing Sheet

(51) Int. Cl.
*F01K 17/02* (2006.01)
*F25B 30/00* (2006.01)
*F28C 1/00* (2006.01)
*F28D 20/00* (2006.01)
*F28F 27/02* (2006.01)
*F25B 29/00* (2006.01)

(52) U.S. Cl.
CPC ............ *F25B 29/006* (2013.01); *F25B 30/00* (2013.01); *F28C 1/00* (2013.01); *F28D 20/0034* (2013.01); *F28F 27/02* (2013.01); Y02E 20/14 (2013.01)

(58) Field of Classification Search
CPC .......... F28D 20/00; F28D 21/00; F28F 27/00; F28F 27/02; F28C 1/00; F25B 15/00; F25B 27/02; F25B 29/00; F25B 29/006; F25B 30/00; F25B 30/06; F24D 17/02; F24D 3/18; F01K 17/005; F01K 17/025; F02G 5/02; Y02E 20/14
USPC ........... 165/10, 47, 48.1, 58; 60/39.01, 39.5, 60/39.511, 39.52, 39.53
See application file for complete search history.

(56) References Cited

U.S. PATENT DOCUMENTS

| | | | | |
|---|---|---|---|---|
| 7,481,060 B2* | 1/2009 | Haertel | ................... | F02C 7/143 60/39.3 |
| 8,286,423 B2* | 10/2012 | Yuri | .......................... | F02G 5/00 237/12.1 |
| 8,327,647 B2* | 12/2012 | Guidati | ................... | F01K 23/10 60/39.182 |
| 8,572,973 B2* | 11/2013 | Li | ........................... | F01K 17/02 60/650 |
| 8,733,103 B2* | 5/2014 | Paya Diaz | ................ | F03G 6/00 60/641.6 |
| 8,931,277 B2* | 1/2015 | Peterson | ................... | C02F 1/22 60/651 |
| 9,188,027 B2* | 11/2015 | Ogata | ........................ | F01K 9/02 |
| 9,391,254 B2* | 7/2016 | Lessard | ................... | H01L 35/30 |
| 2001/0004830 A1* | 6/2001 | Wakana | .................... | F02C 6/14 60/39.182 |
| 2001/0020360 A1* | 9/2001 | Tsukamoto | ........... | F01K 21/047 60/39.53 |
| 2010/0018228 A1* | 1/2010 | Flammang | .............. | F25B 27/02 62/115 |
| 2013/0312415 A1* | 11/2013 | Dubovitskiy | ........... | F01K 25/08 60/651 |
| 2014/0026602 A1* | 1/2014 | Yabase | .................... | F25B 15/00 62/101 |
| 2015/0184593 A1* | 7/2015 | Kraft | ........................ | F02C 6/18 60/782 |

FOREIGN PATENT DOCUMENTS

| | | |
|---|---|---|
| CN | 103759469 A | 4/2014 |
| CN | 104697238 A | 6/2015 |
| WO | 9516885 A1 | 6/1995 |

* cited by examiner

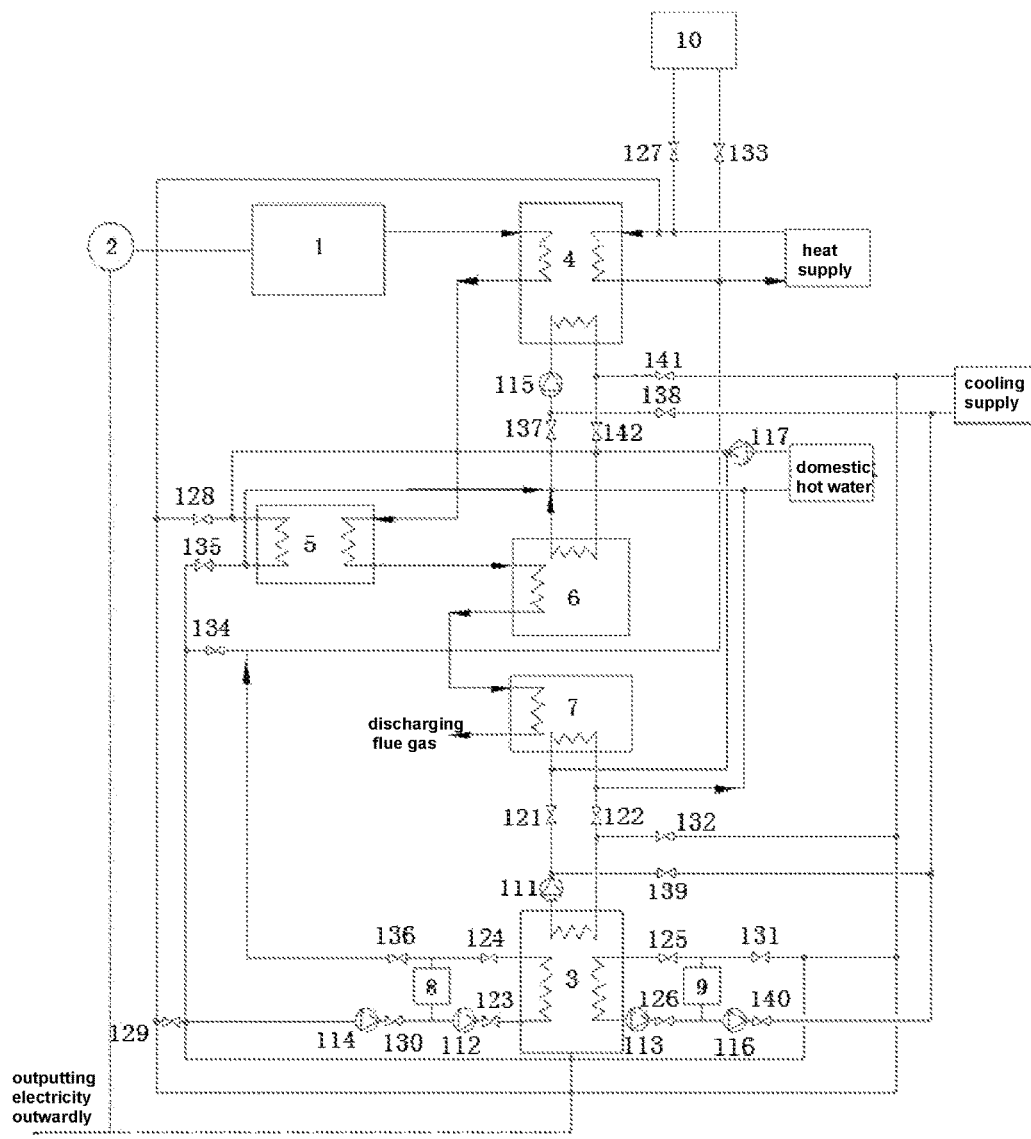

COMBINED HEATING POWER AND COOLING APPARATUS WITH ENERGY STORAGE TYPE ADAPTED TO AN ACTIVE DISTRIBUTION NETWORK AND ITS METHOD

CROSS-REFERENCE TO RELATED APPLICATIONS

The present application is a U.S. National Phase of International Patent Application Serial No. PCT/CN2015/096997, entitled "ENERGY STORAGE TYPE COMBINED COOLING, HEATING AND POWER DEVICE SUITABLE FOR ACTIVE POWER DISTRIBUTION NETWORK AND OPERATION METHOD THEREOF," filed on Dec. 10, 2015. International Patent Application Serial. No. PCT/CN2015/096997 claims priority to Chinese Patent Application No. 201510076196.7, filed on Feb. 12, 2015. The entire contents of each of the above-cited applications are hereby incorporated by reference for all purposes.

FIELD OF THE INVENTION

The present invention relates to a combined heating power and cooling apparatus and its operating method, in particular to a combined heating power and cooling apparatus with energy storage type adapted to an active distribution network and its operating method, belonging to the technical field of energy power.

BACKGROUND OF THE INVENTION

An active distribution network is a concept based on active management of a distribution network. Since intermittent and distributed energy with a variety of types in incorporated in the distribution network, it is a key to achieve a coordinated control for distributed power supplies and users in an area within the distribution network, and to ensure the stable and economic operation of the distribution network. A combined heating power and cooling system is a kind of efficient distributed power supply with high energy utilization efficiency, however, there is a problem that the cooling and heating load of the combined heating power and cooling system cannot be coordinated with the power demand of the network when it is incorporated into the active distribution network. Because when the combined heating power and cooling system operates by determining electricity based on cooling or determining electricity based on heat to meet the cooling or heating demand of an user in a certain period, while the period is a valley of electricity consumption when grid scheduling does not allow for generating electricity on grid, and an electricity storing apparatus has the drawbacks such as relatively large energy consumption, expensive price, diseconomy, if the electricity storing apparatus is not added, cooling or heat cannot be generated since the grid scheduling does not allow for generating electricity in this period, thereby affecting the heating or cooling load supplying of the user.

A main approach for further improving energy utilization efficiency of a combined heating power and cooling system is to dig exhaust gas heat of an engine. However, the existing technology still cannot adequately recovery the flue gas heat, and a large amount of flue gas condensation heat is still not be recovered. Also, the existing system employing heat pump technology to recover flue gas waste heat still does not change the operating manner of "determining electricity based on heat" thereof, not fitting demands of electricity scheduling of an active distribution network. If using a combination of energy storing device and combined heating power and cooling system, wherein the energy storing device is used for stabilizing heat outputting fluctuations, the combined heating power and cooling system may operates in a manner of "determining heat based on electricity". However, when combining with recovering technology of flue gas waste heat of the system, the stable recovery of the flue gas waste heat cannot be ensured.

SUMMARY OF THE INVENTION

For the above-mentioned problems, the purpose of the present invention is to provide a combined heating power and cooling apparatus with energy storage type adapted to an active distribution network and its operating method, which can not only improve utilization efficiency of energy, but also can ensure a stable recovery of flue gas waste heat, thereby further increasing grid regulation ability for coping with a situation of an increasing power peak and off-peak difference.

To achieve the above goals, the following technical solution is adopted in the present invention: a combined heating power and cooling apparatus with energy storage type adapted for an active distribution network, characterized in that: the apparatus comprises a generation apparatus, a generator, an energy storing electric heat pump, a waste heat recovering and absorbing heat pump, a high temperature flue gas-water heat exchanger, a medium temperature flue gas-water heat exchanger, a low temperature flue gas-water heat exchanger, a high temperature energy storing canister, a low temperature energy storing canister, a cooling tower, a number of circulating water pumps and a number of valves; wherein the generation apparatus is connected to the generator for powering the generator, and the generator is connected to the energy storing electric heat pump for driving it to operate.

A flue gas outlet of the generation apparatus is connected to a generator flue gas inlet of the waste heat recovering and absorbing heat pump, a generator flue gas outlet of the waste heat recovering and absorbing heat pump is connected to a flue gas inlet of the high temperature flue gas-water heat exchanger, a flue gas outlet of the high temperature flue gas-water heat exchanger is connected to a flue gas inlet of the medium temperature flue gas-water heat exchanger, a flue gas outlet of the medium temperature flue gas-water heat exchanger is connected to a flue gas inlet of the low temperature flue gas-water heat exchanger, and a flue gas outlet of the low temperature flue gas-water heat exchanger is connected to external environment. A water side outlet of a first evaporator of the energy storing electric heat pump is connected to a water side inlet of the low temperature flue gas-water heat exchanger sequentially through a first circulating water pump and a first valve, a water side outlet of the low temperature flue gas-water heat exchanger is connected to a water side inlet of the first evaporator of the energy storing electric heat pump through a second valve; a water side inlet of a condenser of the energy storing electric heat pump is connected to a water side outlet of the high temperature energy storing canister sequentially through a third valve and a second circulating water pump, and a water side outlet of the condenser of the energy storing electric heat pump is connected to a water side inlet of the high temperature energy storing canister through a fourth valve; a water side inlet of a second evaporator of the energy storing electric heat pump is connected to a water side outlet of the low temperature energy storing canister through a fifth valve, and a water side outlet of the second evaporator of the energy storing electric heat pump is connected to a water side inlet of the low temperature energy storing canister through a third circulating water pump and a sixth valve. A condenser and absorber side inlet of the waste heat recovering and absorbing heat pump is connected to three inlet branches in parallel, wherein a first inlet branch is connected to a backwater port of heat supply, a second inlet branch is connected to a water outlet of the cooling tower through a seventh valve, a third inlet branch is connected to a water supply port of cooling supply, and the third inlet branch is further connected to four branched inlet branches in parallel, wherein a first branched inlet branch is connected to a water side inlet of the high temperature flue gas-water heat exchanger through a eighth valve, a second branched inlet branch is connected to a water side inlet of the high temperature energy storing canister sequentially through a ninth valve, a fourth circulating water pump and a tenth valve, a third branched inlet branch is connected to the water side inlet of the low temperature energy storing canister through a eleventh valve, and a fourth branched inlet branch is connected to an outlet of the second valve through a twelfth valve; a condenser and absorber side outlet of the waste heat recovering and absorbing heat pump is connected to three outlet branches in parallel, wherein a first outlet branch is connected to an inlet of the cooling tower through a thirteenth valve, a second outlet branch is connected to a water supply port of heat supply, the third outlet branch is connected to three branched outlet branches in parallel through a fourteenth valve, wherein a first branched outlet branch is connected to a water side outlet of the high temperature flue gas-water heat exchanger through a fifteenth valve, a second branched outlet branch is connected to an inlet of the fourth circulating water pump, a third branched outlet branch is connected to an inlet of the eleventh valve, and an inlet of the fourteenth valve is further connected to the water side outlet of the high temperature energy storing canister through a sixteenth valve. A water side outlet of the high temperature flue gas-water heat exchanger and the water side outlet of the medium temperature flue gas-water heat exchanger are connected to a water side inlet of the evaporator of the waste heat recovering and absorbing heat pump sequentially through a seventeenth valve and a fifth circulating water pump; an inlet of the fifth circulating water pump is further respectively connected to three branched branches through a eighteenth valve, wherein a first branched branch is connected to a backwater port of cooling supply, a second branched branch is connected to an outlet of the first circulating water pump through a nineteenth valve, and a third branched branch is connected to an outlet of the low temperature energy storing canister sequentially through a twentieth valve and a sixth circulating water pump. A water side outlet of the evaporator of the waste heat recovering and absorbing heat pump is connected to inlets of a twenty-first valve and a twenty-second valve in parallel, an outlet of the twenty-first valve is connected to the water supply port of the cooling supply, an outlet of the twenty-second valve is connected to a water side inlet of the high temperature flue gas-water heat exchanger, a water side inlet of the medium temperature flue gas-water heat exchanger and a backwater port for domestic hot water in parallel, and the twenty-second valve is connected to a seventh circulating water pump in series before the backwater port of domestic hot water; an outlet of the seventh circulating water pump is further connected to the water side inlet of the low temperature flue gas-water heat exchanger, a water supply port for domestic hot water is connected to the water side outlets of the high temperature flue gas-water heat exchanger, the medium temperature flue gas-water heat exchanger and the low temperature flue gas-water heat exchanger, respectively.

The generation apparatus uses one of a micro gas turbine, a gas internal combustion engine, and a gas turbine.

Each of the high temperature flue gas-water heat exchanger, the medium temperature flue gas-water heat exchanger and the low temperature flue gas-water heat exchanger employs a wall partitioning heat exchanger or a direct contact heat exchanger, wherein the direct contact heat exchanger utilizes an empty tower heat exchanger, a tower plate heat exchanger or a filler heat exchanger.

An operating method using the combined heating power and cooling apparatus with energy storage type comprises the following contents: the apparatus is caused to respectively operate during electrical load valleys, means and peaks in summer and winter through different combinations of valve opening and closing:

1) the combined heating power and cooling apparatus with energy storage type operates during electrical load valleys, means and peaks in winter through different combinations of valve opening and closing, the particular operation process is: a) when the apparatus is operated during electrical load valleys in Winter, that is, when the active distribution network needs to be operated in a lowered electrical load, opening a eighth valve, a fifteenth valve, a seventeenth valve, a twenty-second valve and a fifth circulating pump; closing each of a ninth valve, a eighteenth valve, a twenty-first valve, a twelfth valve, a nineteenth valve, a seventh valve and a thirteenth valve; closing a tenth valve, a eleventh valve, a sixteenth valve, a twentieth valve, a fourth circulating water pump, a sixth circulating water pump and a seventh circulating water pump and opening a fourteenth valve such that the heat net backwater flows to a waste heat recovering and absorbing heat pump and a high temperature flue gas-water heat exchanger, respectively, and then is supplied to heat net water supply pipelines after being heated by the flue gas, a energy storing electric heat pump is now in operation, consuming the amount of generated electricity from the combined heating power and cooling apparatus while recovering the flue gas waste heat of the low temperature flue gas-water heat exchanger; opening a fourth valve, a fifth valve, a third valve, a sixth valve, a second circulating water pump and a third circulating water pump and opening a first valve, a second valve and a first circulating water pump simultaneously such that the stored water in a high temperature energy storing canister flows to a condenser of a energy storing electric heat pump and then returns back to the high temperature energy storing canister after being heated, the stored water in the low temperature energy storing canister flows to a first evaporator of the energy storing electric heat pump and returns back to the low temperature energy storing canister after being cooled, after recovering the flue gas waste heat, the cooling water in a low temperature flue gas condensation heat exchanger flows to a second evaporator of the energy storing electric heat pump and then returns back the low temperature flue gas condensation heat exchanger after being cooled to continue to absorb the flue gas waste heat; b) when the apparatus is operated during electrical load means in winter, disabling each of the energy storing electric heat pump, the second circulating water pump, the third circulating water pump and the first circulating water pump, and operating other parts as the same as those in the electrical load valleys; c) when the apparatus is operated during electric load peaks in winter, that is, when more generated electricity from the system is required on grid, closing each of the eighteenth valve, the twenty-first valve, the seventh valve, the thirteenth valve, the fourth valve, the fifth valve, the third valve, the sixth valve, the fourteenth valve and the ninth valve; opening each of the seventeenth valve, the twenty-second valve, the fifth circulating pump, the first valve, the second valve, the eighth valve, the twelfth valve, the fifteenth valve and the nineteenth valve; disabling each of the energy storing electric heat pump, the second circulating water pump, the third circulating water pump, the first circulating water pump and the seventh circulating water pump; opening each of the sixteenth valve, the eleventh valve, the tenth valve, the twentieth valve and opening each of the fourth circulating water pump and the sixth circulating water pump such that the sixth circulating water pump draws the low temperature water out of the low temperature energy storing canister and delivers it to the low temperature flue gas condensation heat exchanger, after recovering the flue gas waste heat, the low temperature water is converged with the heat net backwater and then is delivered to the high temperature flue gas-water heat exchanger for further recovering the flue gas waste heat, the heated water is divided into two streams, one of which returns back to the low temperature energy storing canister, and another enters into the high temperature energy storing canister such that the high temperature water in the high temperature energy storing canister is pressed out and delivered to a heat supply pipe network;

2) the combined heating power and cooling apparatus with energy storage type is caused to operate during electrical load valleys, means and peaks in summer through different combinations of valve opening and closing: a) when the apparatus is operated during electrical load valleys in summer, that is, when the active distribution network needs to be operated in a lowered electrical load, closing each of the ninth valve, the fourteenth valve, the sixteenth valve, the eleventh valve, the tenth valve, the twentieth valve, the first valve, the second valve, the fourth circulating water pump and the sixth circulating water pump such that the energy storing electric heat pump is now in operation, consuming the amount of generated electricity from the combined heating power and cooling apparatus; opening the fourth valve, the fifth valve, the third valve, the sixth valve, the twelfth valve, the nineteenth valve, the second circulating water pump, the third circulating water pump, the first circulating water pump and the seventh circulating water pump such that the backwater of an user cooling supply pipeline enters into the second evaporator of the energy storing electric heat pump and is delivered to supplied water of the user cooling supply pipeline, the stored water in the high temperature energy storing canister flows into the condenser of the energy storing electric heat pump and returns back to the high temperature energy storing canister after being heated, the stored water in the low temperature energy storing canister flows into the first evaporator of the energy storing electric heat pump and returns back to the low temperature energy storing canister after being cooled; closing the seventeenth valve and the twenty-second valve and opening the eighteenth valve, the twenty-first valve and the fifth circulating water pump such that the waste heat recovering and absorbing heat pump switches to a cooling operating condition for cooling supply; opening each of the seventh valve and the thirteenth valve such that the cooling water switches to the cooling tower for dissipating heat; for a supply part of domestic hot water, closing both the eighth valve and the fifteenth valve such that each of the high temperature flue gas-water heat exchanger, the medium temperature flue gas-water heat exchanger and the low temperature flue gas-water heat exchanger recovers the flue gas waste heat for supplying to the domestic hot water; b) when the apparatus is operated during electrical load means in Summer, disabling each of the energy storing electric heat pump, the second circulating water pump, the third circulating water pump and the first circulating water pump, and operating other parts as the same as those in electrical load valleys; c) when the apparatus is operated during load peaks in Summer, that is, when more generated electricity from the system is required, closing each of the twelfth valve, the nineteenth valve, the seventeenth valve, the twenty-second valve and opening the eighteenth valve, the twenty-first valve and the fifth circulating water pump such that the waste heat recovering and absorbing heat pump is switched to the cooling operating condition for cooling supply; opening the seventh valve and the thirteenth valve such that the cooling water is switched to the cooling tower for dissipating heat; closing the fourth valve, the fifth valve, the third valve, the sixth valve, the first valve and the second valve, disabling the energy storing electric heat pump, the second circulating water pump, the third circulating water pump and the first circulating water pump, opening the sixteenth valve, the eleventh valve, the tenth valve, the ninth valve, the tenth valve, the eighth valve, the fifteenth valve and the fourteenth valve and opening each of the fourth circulating water pump, the sixth circulating water pump and the seventh circulating water pump such that the fourth circulating water pump dissipates the heat in the high temperature energy storing canister to the cooling tower, or supplies it to domestic heat water, the sixth circulating water pump draws the low temperature water out of the low temperature energy storing canister and delivers it to the user for cooling supply.

The present invention has the following advantages due to the utilization of above the technical solutions: 1) The present invention comprises a generation apparatus, a generator, a waste heat recovering and absorbing heat pump, a high temperature flue gas-water heat exchanger, a medium temperature flue gas-water heat exchanger, a low temperature flue gas-water heat exchanger, a energy storing electric heat pump, a high temperature energy storing canister, a low temperature energy storing canister, a cooling tower and various connection valves and circulating water pump. The present invention digs flue gas heat energy from an engine through the technical means. Because a deep waste heat recovery apparatus for flue gas is comprised, the flue gas waste heat in the combined heating power and cooling system may be partially or fully recovered, thereby adequately recovering an amount of flue gas condensation heat and improving the energy utilization efficiency of the system. 2) Due to the presence of high temperature energy storing canister and the low temperature energy storing canister, the present invention can stabilize fluctuations of output powers of heating and cooling while effectively ensuring the stable recovery of the flue gas waste heat. 3) The operating method of present invention changes the traditional operation modes of the combined heating power and cooling system "determining electricity based on heat" and "determining electricity based on cooling", causes the combined heating power and cooling system to be able to regulate power of the generated electricity on grid, participate in the regulation of grid load, solve the problem of a limited ability of generation peak regulation due to the inter-coupling of power generation, heat supply and cooling supply, thereby increase grid regulation ability for coping with a situation of an increasing power peak and off-peak difference.

DESCRIPTION OF THE DRAWINGS

FIG. 1 is a schematic diagram of structure of a combined heating power and cooling apparatus with energy storage type according to the present invention.

DESCRIPTION OF THE PREFERRED EMBODIMENTS

The present invention will be described below in detail in combination with the drawings. However, it should be appreciated that the drawings is provided to better understand the present invention, and should not be understood as limitations to the present invention. In the description of the present invention, it should be understood that, terms "first", "second" and other like terms are merely used for the purpose of description, and should not be understood indicating or implying a relative importance.

As shown in FIG. 1, a combined heating power and cooling apparatus with energy storage type of the present invention comprises a micro gas turbine 1, a generator 2, a energy storing electric heat pump 3, a waste heat recovering and absorbing heat pump 4, a high temperature flue gas-water heat exchanger 5, a medium temperature flue gas-water heat exchanger 6, a low temperature flue gas-water heat exchanger 7, a high temperature energy storing canister 8, a low temperature energy storing canister 9, a cooling tower 10, a number of circulating water pumps and a number of valves, wherein the micro gas turbine 1 is connected to the generator 2 to power the generator 2, and the generator 2 is connected to the energy storing electric heat pump 3 for driving it the energy storing electric heat pump 3 to operate. A flue gas outlet of the micro gas turbine 1 is connected to a flue gas inlet of a generator of the waste heat recovering and absorbing heat pump 4, a flue gas outlet of the generator of the waste heat recovering and absorbing heat pump 4 is connected to a flue gas inlet of the high temperature flue gas-water heat exchanger 5, a flue gas outlet of the high temperature flue gas-water heat exchanger 5 is connected to a flue gas inlet of the medium temperature flue gas-water heat exchanger 6, a flue gas outlet of the medium temperature flue gas-water heat exchanger 6 is connected to a flue gas inlet of the low temperature flue gas-water heat exchanger 7, and the flue gas outlet of the low temperature flue gas-water heat exchanger 7 is connected to the external environment.

A water side outlet of a first evaporator of the energy storing electric heat pump 3 is connected to a water side inlet of the low temperature flue gas-water heat exchanger 7 sequentially through a first circulating water pump 111 and a first valve 121, a water side outlet of the low temperature flue gas-water heat exchanger 7 is connected to a water side inlet of the first evaporator of the energy storing electric heat pump 3 through a second valve 122. A water side outlet of a condenser of the energy storing electric heat pump 3 is connected to a water side inlet of the high temperature energy storing canister 8 sequentially through a third valve 123 and a second circulating water pump 112, and a water side inlet of the condenser of the energy storing electric heat pump 3 is connected to a water side outlet of the high temperature energy storing canister 8 through a fourth valve 124. A water side inlet of a second evaporator of the energy storing electric heat pump 3 is connected to a water side outlet of the low temperature energy storing canister 9 through a fifth valve 125, and a water side outlet of the second evaporator of the energy storing electric heat pump 3 is connected to a water side inlet of the low temperature energy storing canister 9 through a third circulating water pump 113 and a sixth valve 126.

A condenser and absorber side inlet of the waste heat recovering and absorbing heat pump 4 is connected to three inlet branches in parallel, wherein a first inlet branch is connected to a backwater port of heat supply, a second inlet branch is connected to a water outlet of the cooling tower 10 through a seventh valve 127, a third inlet branch is connected to a water supply port of cooling supply, and the third inlet branch is further connected to four branched inlet branches in parallel, wherein a first branched inlet branch is connected to the water side inlet of the high temperature flue gas-water heat exchanger 5 through a eighth valve 128, a second branched inlet branch is connected to the water side inlet of the high temperature energy storing canister 8 sequentially through a ninth valve 129, a fourth circulating water pump 114 and a tenth valve 130, a third branched inlet branch is connected to the water side inlet of the low temperature energy storing canister 9 through a eleventh valve 131, and a fourth branched inlet branch is connected to an outlet of the second valve 122 through a twelfth valve 132. An evaporation side outlet of the waste heat recovering and absorbing heat pump 4 is connected to three outlet branches in parallel, wherein a first outlet branch is connected to an inlet of the cooling tower through a thirteenth valve 133, a second outlet branch is connected to a water supply port of heat supply, a third outlet branch is connected to three branched outlet branches in parallel through a fourteenth valve 134, wherein a first branched outlet branch is connected to a water side outlet of the high temperature flue gas-water heat exchanger 5 through a fifteenth valve 135, a second branched outlet branch is connected to an inlet of the fourth circulating water pump 114, a third branched outlet branch is connected to an inlet of the eleventh valve 131, and an inlet of the fourteenth valve 134 is further connected to the water side outlet of the high temperature energy storing canister 8 through a sixteenth valve 136.

The water side outlet of the high temperature flue gas-water heat exchanger 5 and a water side outlet of the medium temperature flue gas-water heat exchanger 6 are connected to a water side inlet of the evaporator of the waste heat recovering and absorbing heat pump 4 sequentially through a seventeenth valve 137 and a fifth circulating water pump 115. An inlet of the fifth circulating water pump 115 is further respectively connected to three branched branches through a eighteenth valve 138, wherein a first branched branch is connected to a backwater port of cooling supply, a second branched branch is connected to an outlet of the first circulating water pump 111 through a nineteenth valve 139, and a third branched branch is connected to an outlet of the low temperature energy storing canister 9 sequentially through a twentieth valve 140 and a sixth circulating water pump 116.

A water side outlet of the evaporator of the waste heat recovering and absorbing heat pump 4 is connected to inlets of a twenty-first valve 141 and a twenty-second valve 142 in parallel, an outlet of the twenty-first valve 141 is connected to the water supply port of the cooling supply, an outlet of the twenty-second valve 142 is connected to the water side inlet of the high temperature flue gas-water heat exchanger 5, a water side inlet of the medium temperature flue gas-water heat exchanger 6 and a backwater port of domestic hot water in parallel, and the twenty-second valve 142 is connected to a seventh circulating water pump 117 in series before the backwater port of the domestic hot water. An outlet of the seventh circulating water pump 117 is further connected to the water side inlet of the low temperature flue gas-water heat exchanger 7. The water supply port of the domestic hot water is connected to the water side outlet of the high temperature flue gas-water heat exchanger 5, the water side outlet of the medium temperature flue gas-water heat exchanger 6 and the water side outlet of the low temperature flue gas-water heat exchanger 7, respectively.

In a preferred embodiment, the micro gas turbine 1 is, but not limited to, the generation apparatus used in the embodiment of the present invention. The generation apparatus may also employ a gas internal combustion engine or a gas turbine.

In a preferred embodiment, each of the high temperature flue gas-water heat exchanger 5, the medium temperature flue gas-water heat exchanger 6 and the low temperature flue gas-water heat exchanger 7 may utilize a wall partitioning heat exchanger or a direct contact heat exchanger, wherein the direct contact heat exchanger may use an empty tower heat exchanger, a tower plate heat exchanger or a filler heat exchanger.

In a preferred embodiment, the generator 2 may also be connected with an external device for outwardly outputting power.

Based on the combined heating power and cooling apparatus with energy storage type of the present invention, the operational principles of the combined heating power and cooling apparatus with energy storage type are simply described below.

In an operating condition of heat supply, the high temperature flue gas produced after the electricity generation of the micro gas turbine 1 enters into the waste heat recovering and absorbing heat pump 4, the medium temperature flue gas-water heat exchanger 6 recovers the flue gas waste heat with medium temperature for the heat supply; the generator 2 drives the energy storing electric heat pump 3 to operate such that the flue gas condensation heat of low temperature is recovered through the low temperature flue gas-water heat exchanger 7, thereby further decreasing the flue gas temperature; meanwhile, the high temperature flue gas-water heat exchanger 5 directly exchanges heat with the heat net backwater to recover the flue gas waste heat of high temperature; the high temperature flue gas-water heat exchanger 5, the waste heat recovering and absorbing heat pump 4, the energy storing electric heat pump 3 collectively utilize the flue gas waste heat for the heat supply, thereby improving the heat supply efficiency of the combined heating power and cooling apparatus.

In an operating condition of cooling supply, the high temperature flue gas produced after the electricity generation of the micro gas turbine 1 drives the waste heat recovering and absorbing heat pump 4 to supply cooling for a user, the generator 2 drives the energy storing electric heat pump 3 to supply cooling for the user. The exhaust heat of the waste heat recovering and absorbing heat pump 4 and the energy storing electric heat pump 3 is discharged to the environment through the cooling tower 10. The exhaust heat of the energy storing electric heat pump 3 may also be used to heat domestic hot water. The high temperature flue gas-water heat exchanger 5, the medium temperature flue gas-water heat exchanger 6, and the low temperature flue gas-water heat exchanger 7 recover the flue gas waste heat for heating domestic hot water.

Based on the combined heating power and cooling apparatus with energy storage type of present invention, the operating method of the combined heating power and cooling apparatus with waste heat recovery and energy storage type is described in detail below. In embodiments of the present invention, the operating manners of the combined heating power and cooling apparatus with energy storage type are regulated through different combinations of valve opening and closing such that the apparatus may operates during electrical load valleys, electrical load means and electrical load peaks in Winter and Summer, respectively. The detailed process is described as follows.

1. The combined heating power and cooling apparatus with energy storage type may operate during electrical load valleys, means and peaks in Winter through different combinations of valve opening and closing, and the detailed operating process is:

1) when the apparatus operates during electrical load valleys in Winter, that is, when the active distribution network needs to operate in a lowered electrical load, each of a eighth valve 28, a fifteenth valve 135, a seventeenth valve 137, a twenty-second valve 142 and a fifth circulating pump 115 is opened, each of a ninth valve 129, a eighteenth valve 138, a twenty-first valve 141, a twelfth valve 132, a nineteenth valve 139, a seventh valve 127 and a thirteenth valve 133 is closed; a tenth valve 130, a eleventh valve 131, a sixteenth valve 136, a twentieth valve 140, a fourth circulating water pump 114, a sixth circulating water pump 116 and a seventh circulating water pump 117 are closed and a fourteenth valve 134 is opened simultaneously, such that the heat net backwater flows into a waste heat recovering and absorbing heat pump 4 and a high temperature flue gas-water heat exchanger 5, and then is delivered to a heat net water supply pipeline after being heated by the flue gas, the energy storing electric heat pump 3 is now in operation, consuming the amount of generated electricity from the combined heating power and cooling apparatus while recovering the flue gas waste heat of the low temperature flue gas-water heat exchanger 7; a fourth valve 124, a fifth valve 125, a third valve 123, a sixth valve 126, a second circulating water pump 112 and a third circulating water pump 113 are opened, a first valve 121, a second valve 122 and a first circulating water pump 111 are opened such that the stored water in a high temperature energy storing canister 8 flows to a condenser of a energy storing electric heat pump 3 and then returns back to the high temperature energy storing canister 8 after being heated, the stored water in the low temperature energy storing canister 9 flows to a first evaporator of the energy storing electric heat pump 3 and returns back to the low temperature energy storing canister 9 after being cooled, after recovering the flue gas waste heat, the cooling water in a low temperature flue gas condensation heat exchanger 7 flows into a second evaporator of the energy storing electric heat pump 3 and then returns back the low temperature flue gas condensation heat exchanger 7 after being cooled to continue to absorb the flue gas waste heat.

2) When the apparatus is operated during electrical load means in Winter, each of the energy storing electric heat pump 3, the second circulating water pump 112, the third circulating water pump 113 and the first circulating water pump 111 is disabled, and other parts are operated as the same as those in electrical load valleys.

3) When the apparatus is operated during electric load peaks in Winter, that is, when more generated electricity on grid from the system is required, each of the eighteenth valve 138, the twenty-first valve 141, the seventh valve 127, the thirteenth valve 133, the fourth valve 124, the fifth valve 125, the third valve 123, the sixth valve 126, the fourteenth valve 134 and the ninth valve 129 is closed; each of the seventeenth valve 137, the twenty-second valve 142 is opened; and each of the fifth circulating water pump 115, the first valve 121, the second valve 122, the eighth valve 128, the twelfth valve 132, the fifteenth valve 135 and the nineteenth valve 139 is opened simultaneously; each of the energy storing electric heat pump 3, the second circulating water pump 112, the third circulating water pump 113, the first circulating water pump 111 and the seventh circulating water pump 117 is disabled; each of the sixteenth valve 136, the eleventh valve 131, the tenth valve 130, the twentieth valve 140 is opened; and each of the fourth circulating water pump 114 and the sixth circulating water pump 116 is opened such that the sixth circulating water pump 116 draws the low temperature water out of the low temperature energy storing canister 9 and delivers it to the low temperature flue gas condensation heat exchanger 7, after recovering the flue gas waste heat, the low temperature water is converged with the heat net backwater and then is delivered to the high temperature flue gas-water heat exchanger for further recovering the flue gas waste heat. The heated water is divided into two streams, one of which returns back to the low temperature energy storing canister 9, and another enters into the high temperature energy storing canister 8 such that the high temperature water in the high temperature energy storing canister 8 is pressed out and delivered to a heat supply pipe network.

2. The combined heating power and cooling apparatus with energy storage type may operate during electrical load valleys, means and peaks in summer through different combinations of valve opening and closing.

1) When the apparatus is operated during electrical load valleys in Summer, that is, when the active distribution network needs to be operated in a lowered electrical load, the ninth valve 129, the fourteenth valve 134, the sixteenth valve 136, the eleventh valve 131, the tenth valve 130, the twentieth valve 140, the first valve 121, the second valve 122, the fourth circulating water pump 114 and the sixth circulating water pump 116 are closed, the energy storing electric heat pump 3 is now in operation, consuming the amount of generated electricity from the combined heating power and cooling apparatus; the fourth valve 124, the fifth valve 125, the third valve 123, the sixth valve 126, the twelfth valve 132, the nineteenth valve 139, the second circulating water pump 112, the third circulating water pump 113 and the first circulating water pump 111 are opened, the backwater of user cooling supply pipelines enters into the second evaporator of the energy storing electric heat pump 3, and is delivered to supplied water of the user cooling supply pipelines after being cooled, the stored water in the high temperature energy storing canister 8 flows into the condenser of the energy storing electric heat pump 3 and returns back to the high temperature energy storing canister 8 after being heated, the stored water in the low temperature energy storing canister 9 flows into the first evaporator of the energy storing electric heat pump 3 and returns back to the low temperature energy storing canister 9 after being cooled; each of the seventeenth valve 137 and the twenty-second valve 142 is closed, and each of the eighteenth valve 138, the twenty-first valve 141 and the fifth circulating water pump 115 and the seventh circulating water pump is opened such that the waste heat recovering and absorbing heat pump 4 switches to a cooling operating condition for cooling supply; the seventh valve 127 and the thirteenth valve 133 are opened such that the cooling water switches to the cooling tower for dissipating heat. For a supply part of domestic hot water, the eighth valve 128 and the fifteenth valve 135 are closed such that each of the high temperature flue gas-water heat exchanger 5, the medium temperature flue gas-water heat exchanger 6 and the low temperature flue gas-water heat exchanger 7 may recover the flue gas waste heat for supplying to the domestic hot water.

2) When the apparatus is operated during electrical load means in Summer, each of the energy storing electric heat pump 3, the second circulating water pump 112, the third circulating water pump 113 and the first circulating water pump 111 is disabled, and other parts is operated as the same as those in the electrical load valleys.

3) When the apparatus is operated during load peaks in Summer, that is, when more generated electricity from the system is required, each of the twelfth valve 132, the nineteenth valve 139, the seventeenth valve 137, the twenty-second valve 142 is closed and each of the eighteenth valve 138, the twenty-first valve 141 and the fifth circulating water pump 115 is opened such that the waste heat recovering and absorbing heat pump 4 is switched to the cooling operating condition for cooling supply; the seventh valve and the thirteenth valve are opened such that the cooling water is switched to the cooling tower for dissipating heat; each of the fourth valve 124, the fifth valve 125, the third valve 123, the sixth valve 126, the first valve 121 and the second valve 122 is closed, each of the energy storing electric heat pump 3, the second circulating water pump 112, the third circulating water pump 113 and the first circulating water pump 111 is disabled, each of the sixteenth valve 136, the eleventh valve 131, the tenth valve 130, the ninth valve 129, the tenth valve 140, the eighth valve 128, the fifteenth valve 135 and the fourteenth valve 134 is opened, and each of the fourth circulating water pump 114, the sixth circulating water pump 116 and the seventh circulating water pump 117 is opened such that the fourth circulating water pump 114 dissipates the heat in the high temperature energy storing canister 8 to the cooling tower, or supplies it to domestic heat water, the sixth circulating water pump 116 draws the low temperature water out of the low temperature energy storing canister 9 and delivers it to the user for cooling supply.

The above-mentioned embodiments are only used for describing the present invention. Structures, connecting manners, manufacturing processes and the like of components therein are variable. Equivalent modifications and improvements made on the basis of the technical solution of the present invention shall not be excluded from the protection range of the present invention.

The invention claimed is:

1. A combined heating power and cooling apparatus with energy storage type adapted for an active distribution network, wherein the apparatus comprises a generation apparatus, a generator, an energy storing electric heat pump, a waste heat recovering and absorbing heat pump, a high temperature flue gas-water heat exchanger, a medium temperature flue gas-water heat exchanger, a low temperature flue gas-water heat exchanger, a high temperature energy storing canister, a low temperature energy storing canister, a cooling tower, a number of circulating water pumps, and a number of valves, wherein the generation apparatus is connected to the generator to power the generator, and the generator is connected to the energy storing electric heat pump for driving the energy storage electric heat pump to operate; and wherein:

a flue gas outlet of the generation apparatus is connected to a generator flue gas inlet of the waste heat recovering and absorbing heat pump, a generator flue gas outlet of the waste heat recovering and absorbing heat pump is connected to a flue gas inlet of the high temperature flue gas-water heat exchanger, a flue gas outlet of the high temperature flue gas-water heat exchanger is connected to a flue gas inlet of the medium temperature flue gas-water heat exchanger, a flue gas outlet of the medium temperature flue gas-water heat exchanger is connected to a flue gas inlet of the low temperature flue gas-water heat exchanger, and a flue gas outlet of the low temperature flue gas-water heat exchanger is connected to an external environment;

a water side outlet of a first evaporator of the energy storing electric heat pump is connected to a water side inlet of the low temperature flue gas-water heat exchanger sequentially through a first circulating water pump and a first valve, a water side outlet of the low temperature flue gas-water heat exchanger is connected to a water side inlet of the first evaporator of the energy storing electric heat pump through a second valve; a water side inlet of a condenser of the energy storing electric heat pump is connected to a water side outlet of the high temperature energy storing canister sequentially through a third valve and a second circulating water pump, and a water side outlet of the condenser of the energy storing electric heat pump is connected to a water side inlet of the high temperature energy storing canister through a fourth valve; a water side inlet of a second evaporator of the energy storing electric heat pump is connected to a water side outlet of the low temperature energy storing canister through a fifth valve, and a water side outlet of the second evaporator of the energy storing electric heat pump is connected to a water side inlet of the low temperature energy storing canister through a third circulating water pump and a sixth valve;

a condenser and absorber side inlet of the waste heat recovering and absorbing heat pump is connected to three inlet branches in parallel, wherein a first inlet branch is connected to a water port of a heat supply, a second inlet branch is connected to a water outlet of the cooling tower through a seventh valve, a third inlet branch is connected to a water supply port of a cooling supply, and the third inlet branch is further connected to four branched inlet branches in parallel, wherein a first branched inlet branch is connected to a water side inlet of the high temperature flue gas-water heat exchanger through an eighth valve, a second branched inlet branch is connected to the water side inlet of the high temperature energy storing canister sequentially through a ninth valve, a fourth circulating water pump and a tenth valve, a third branched inlet branch is connected to the water side inlet of the low temperature energy storing canister through an eleventh valve, and a fourth branched inlet branch is connected to an outlet of the second valve through a twelfth valve; a condenser and absorber side outlet of the waste heat recovering and absorbing heat pump is connected to three outlet branches in parallel, wherein a first outlet branch is connected to an inlet of the cooling tower through a thirteenth valve, a second outlet branch is connected to a water supply port of heat supply, and a third outlet branch is connected to three branched outlet branches in parallel through a fourteenth valve, wherein a first branched outlet branch is connected to a water side outlet of the high temperature flue gas-water heat exchanger through a fifteenth valve, a second branched outlet branch is connected to an inlet of the fourth circulating water pump, a third branched outlet branch is connected to an inlet of the eleventh valve, and an inlet of the fourteenth valve is further connected to the water side outlet of the high temperature energy storing canister through a sixteenth valve;

the water side outlet of the high temperature flue gas-water heat exchanger and a water side outlet of the medium temperature flue gas-water heat exchanger are connected to a water side inlet of an evaporator of the waste heat recovering and absorbing heat pump sequentially through a seventeenth valve and a fifth circulating water pump; an inlet of the fifth circulating water pump is further respectively connected to three branched branches through an eighteenth valve, wherein a first branched branch is connected to a water port of a cooling supply, a second branched branch is connected to an outlet of the first circulating water pump through a nineteenth valve, and a third branched branch is connected to an outlet of the low temperature energy storing canister sequentially through a twentieth valve and a sixth circulating water pump; and a water side outlet of the evaporator of the waste heat recovering and absorbing heat pump is connected to inlets of a twenty-first valve and a twenty-second valve in parallel, an outlet of the twenty-first valve is connected to the water supply port of the cooling supply, an outlet of the twenty-second valve is connected to the water side inlet of the high temperature flue gas-water heat exchanger, a water side inlet of the medium temperature flue gas-water heat exchanger and a water port for domestic hot water in parallel, and the twenty-second valve is connected to a seventh circulating water pump in series before the water port for domestic hot water; an outlet of the seventh circulating water pump is further connected to the water side inlet of the low temperature flue gas-water heat exchanger, a water supply port for domestic hot water is connected to the water side outlets of the high temperature flue gas-water heat exchanger, the medium temperature flue gas-water heat exchanger, and the low temperature flue gas-water heat exchanger, respectively.

2. The combined heating power and cooling apparatus with energy storage type adapted for the active distribution network of claim 1, wherein the generation apparatus uses one of a micro gas turbine, a gas internal combustion engine, and a gas turbine.

3. The combined heating power and cooling apparatus with energy storage type adapted for the active distribution network of claim 2, wherein each of the high temperature flue gas-water heat exchanger, the medium temperature flue gas-water heat exchanger, and the low temperature flue gas-water heat exchanger employs a wall partitioning heat exchanger or a direct contact heat exchanger, wherein the direct contact heat exchanger utilizes an empty tower heat exchanger, a tower plate heat exchanger, or a filler heat exchanger.

4. An operating method of the combined heating power and cooling apparatus with energy storage type of claim 3, comprising the following contents: the apparatus operates during electrical load valleys, means and peaks in winter and summer through different combinations of valve opening and closing:

1) the combined heating power and cooling apparatus with energy storage type operates during electrical load valleys, means, and peaks in winter through different combinations of valve opening and closing, the particular operation process is:

a) when the apparatus is operated during electrical load valleys in winter, that is, when the active distribution network needs to be operated in a lowered electrical load, opening the eighth valve, the fifteenth valve, the seventeenth valve, the twenty-second valve, and the fifth circulating pump; closing each of the ninth valve, the eighteenth valve, the twenty-first valve, the twelfth valve, the nineteenth valve, the seventh valve, and the thirteenth valve; closing the tenth valve, the eleventh valve, the sixteenth valve, the twentieth valve, the fourth circulating water pump, the sixth circulating water pump, and the seventh circulating water pump and opening the fourteenth valve, such that water flows to the waste heat recovering and absorbing heat pump and the high temperature flue gas-water heat exchanger respectively, and then is supplied to water supply pipelines after being heated by flue gas, the energy storing electric heat pump is now in operation, consuming an amount of generated electricity from the combined heating power and cooling apparatus while recovering flue gas waste heat of the low temperature flue gas-water heat exchanger; opening the fourth valve, the fifth valve, the third valve, the sixth valve, the second circulating water pump, and the third circulating water pump and opening the first valve, the second valve, and the first circulating water pump simultaneously, such that stored water in the high temperature energy storing canister flows to the condenser of the energy storing electric heat pump and then returns back to the high temperature energy storing canister after being heated, stored water in the low temperature energy storing canister flows to the first evaporator of the energy storing electric heat pump and returns back to the low temperature energy storing canister after being cooled, after recovering the flue gas waste heat, cooling water in a low temperature flue gas condensation heat exchanger flows to the second evaporator of the energy storing electric heat pump and then returns back to the low temperature flue gas condensation heat exchanger after being cooled to continue to absorb the flue gas waste heat;

b) when the apparatus is operated during electrical load means in winter, disabling each of the energy storing electric heat pump, the second circulating water pump, the third circulating water pump, and the first circulating water pump, and operating the rest of the components of the apparatus as the rest of the components were operating during electrical load valleys; and c) when the apparatus is operated during electric load peaks in winter, that is, when more generated electricity from the system is required on grid, closing each of the eighteenth valve, the twenty-first valve, the seventh valve, the thirteenth valve, the fourth valve, the fifth valve, the third valve, the sixth valve, the fourteenth valve, and the ninth valve; opening each of the seventeenth valve, the twenty-second valve, the fifth circulating pump, the first valve, the second valve, the eighth valve, the twelfth valve, the fifteenth valve, and the nineteenth valve; disabling each of the energy storing electric heat pump, the second circulating water pump, the third circulating water pump, the first circulating water pump, and the seventh circulating water pump; opening each of the sixteenth valve, the eleventh valve, the tenth valve, and the twentieth valve and opening each of the fourth circulating water pump and the sixth circulating water pump, such that the sixth circulating water pump draws low temperature water out of the low temperature energy storing canister and delivers the low temperature water to the low temperature flue gas condensation heat exchanger, after recovering the flue gas waste heat, the low temperature water is converged with the heated water and then is delivered to the high temperature flue gas-water heat exchanger for further recovering of the flue gas waste heat, the heated water is divided into two streams, one of which returns back to the low temperature energy storing canister, and another enters into the high temperature energy storing canister, such that high temperature water in the high temperature energy storing canister is pressed out and delivered to a heat supply pipe network; and 2). the combined heating power and cooling apparatus with energy storage type is caused to operate during electrical load valleys, means, and peaks in summer through different combinations of valve opening and closing, the particular operating process comprising:

a) when the apparatus is operated during electrical load valleys in summer, that is, when the active distribution network needs to be operated in a lowered electrical load, closing each of the ninth valve, the fourteenth valve, the sixteenth valve, the eleventh valve, the tenth valve, the twentieth valve, the first valve, the second valve, the fourth circulating water pump, and the sixth circulating water pump, such that the energy storing electric heat pump is now in operation, consuming the amount of generated electricity from the combined heating power and cooling apparatus; opening the fourth valve, the fifth valve, the third valve, the sixth valve, the twelfth valve, the nineteenth valve, the second circulating water pump, the third circulating water pump, the first circulating water pump, and the seventh circulating water pump, such that backwater of a user cooling supply pipeline enters into the second evaporator of the energy storing electric heat pump and is delivered to supplied water of the user cooling supply pipeline, stored water in the high temperature energy storing canister flows into the condenser of the energy storing electric heat pump and returns back to the high temperature energy storing canister after being heated, the stored water in the low temperature energy storing canister flows into the first evaporator of the energy storing electric heat pump and returns back to the low temperature energy storing canister after being cooled; closing the seventeenth valve and the twenty-second valve and opening the eighteenth valve, the twenty-first valve, and the fifth circulating water pump, such that the waste heat recovering and absorbing heat pump switches to a cooling operating condition for cooling supply; opening each of the seventh valve and the thirteenth valve, such that the cooling water switches to the cooling tower for dissipating heat; for a supply part of domestic hot water, closing both the eighth valve and the fifteenth valve, such that each of the high temperature flue gas-water heat exchanger, the medium temperature flue gas-water heat exchanger, and the low temperature flue gas-water heat exchanger recovers the flue gas waste heat for supplying to the domestic hot water;

b) when the apparatus is operated during electrical load means in summer, disabling each of the energy storing electric heat pump, the second circulating water pump, the third circulating water pump, and the first circulating water pump, and operating the rest of the components of the apparatus as the rest of the components were operating during electrical load valleys; and c) when the apparatus is operated during electrical load peaks in summer, that is, when more generated electricity from the system is required, closing each of the twelfth valve, the nineteenth valve, the seventeenth valve, and the twenty-second valve and opening the eighteenth valve, the twenty-first valve, and the fifth circulating water pump, such that the waste heat recovering and absorbing heat pump is switched to the cooling operating condition for cooling supply; opening the seventh valve and the thirteenth valve, such that the cooling water is switched to the cooling tower for dissipating heat; closing the fourth valve, the fifth valve, the third valve, the sixth valve, the first valve, and the second valve; disabling the energy storing electric heat pump, the second circulating water pump, the third circulating water pump, and the first circulating water pump; opening the sixteenth valve, the eleventh valve, the tenth valve, the ninth valve, the tenth valve, the eighth valve, the fifteenth valve, and the fourteenth valve and opening each of the fourth circulating water pump, the sixth circulating water pump, and the seventh circulating water pump, such that the fourth circulating water pump dissipates heat in the high temperature energy storing canister to the cooling tower, or supplies heat to domestic hot water, and the sixth circulating water pump draws the low temperature water out of the low temperature energy storing canister and delivers the low temperature water to a user for cooling supply.

\* \* \* \* \*